United States Patent
Kotato et al.

(10) Patent No.: US 6,919,145 B1
(45) Date of Patent: Jul. 19, 2005

(54) NONAQUEOUS ELECTROLYTIC SOLUTION TYPE SECONDARY BATTERY

(75) Inventors: Minoru Kotato, Ibaraki (JP); Takashi Fujii, Ibaraki (JP); Noriko Shima, Ibaraki (JP); Hitoshi Suzuki, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 74 days.

(21) Appl. No.: 09/926,779

(22) PCT Filed: Jun. 15, 2000

(86) PCT No.: PCT/JP00/03910

§ 371 (c)(1),
(2), (4) Date: May 28, 2002

(87) PCT Pub. No.: WO00/79632

PCT Pub. Date: Dec. 28, 2000

(30) Foreign Application Priority Data

Jun. 18, 1999 (JP) .......................... 11/172405
Oct. 27, 1999 (JP) .......................... 11/304847

(51) Int. Cl.$^7$ .............................. H01M 6/16
(52) U.S. Cl. ............ 429/338; 429/330; 429/331; 429/332; 429/231.4; 429/231.8; 429/231.95; 252/62.2
(58) Field of Search ................. 429/338, 330, 429/331, 332, 231.4, 231.8, 231.95; 282/62.2

(56) References Cited

U.S. PATENT DOCUMENTS 5,626,981 A   5/1997   Simon et al.

FOREIGN PATENT DOCUMENTS

| EP | 0 908 905 |   | 4/1999 |
|----|-----------|---|--------|
| JP | 4-87156   | * | 3/1992 |
| JP | 8-171934  |   | 7/1996 |
| JP | 10-27625  |   | 1/1998 |
| JP | 10-233231 |   | 9/1998 |
| JP | 2000-12080 | * | 1/2000 |
| JP | 2000-40526 |   | 2/2000 |

* cited by examiner

Primary Examiner—Laura Weiner
(74) Attorney, Agent, or Firm—Oblon, Spivak, McClelland, Maier & Neustadt, P.C.

(57) ABSTRACT

A non-aqueous electrolyte secondary battery comprising a negative electrode, a positive electrode and an electrolyte having a lithium salt dissolved in a non-aqueous solvent characterized in that said non-aqueous solvent contains a vinylethylene carbonate compound represented by the general formula (I) in an amount of from 0.01 to 20% by weight is subject to minimized decomposition of the electrolyte and can provide a high capacity as well as exhibits excellent storage properties and cycle life performance.

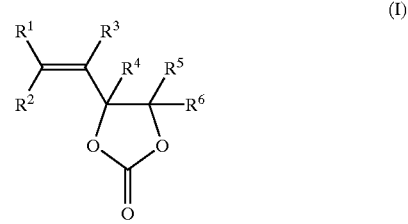

wherein $R^1$, $R^2$, $R^3$, $R^4$, $R^5$ and $R^6$ each independently represent a hydrogen atom or an alkyl group having 1 to 4 carbon atoms.

19 Claims, 3 Drawing Sheets

NONAQUEOUS ELECTROLYTIC SOLUTION TYPE SECONDARY BATTERY

CONTINUING APPLICATION DATA

This application is a 371 of International Application No. PCT/JP00/03910, filed on Jun. 15, 2000.

TECHNICAL FIELD

The present invention relates to a non-aqueous electrolyte secondary battery. More particularly, the present invention relates to a non-aqueous electrolyte secondary battery comprising an electrolyte containing a specific vinylethylene carbonate compound. The battery of the invention is subject to minimized decomposition of electrolyte and exhibits a high capacity as well as excellent storage properties and cycle life performance at high temperatures.

BACKGROUND OF THE INVENTION

With the recent trend for the reduction of weight and size of electrical appliances, there has been a growing demand for lithium secondary battery having a high energy density. Further, with the expansion of the field to which the lithium secondary battery can be applied, it has been desired to further improve the battery performance.

Extensive studies have been heretofore made of secondary battery comprising metallic lithium as a negative electrode as battery which can attain a high capacity. However, the greatest technical problem that prevents the practical use of such a secondary battery was that when charge and discharge are repeated, metallic lithium grows in the form of dendrite and eventually reaches the positive electrode, causing shortcircuiting in the battery.

To cope with this problem, a non-aqueous electrolyte secondary battery comprising as a negative electrode a carbon-based material capable of absorbing/releasing lithium such as artificial graphite and natural graphite has been proposed. In such a non-aqueous electrolyte secondary battery, lithium doesn't exist in metallic state, making it possible to inhibit the formation of dendrite and improve the battery life and safety. In particular, a non-aqueous electrolyte secondary battery comprising a graphite-based carbon material such as artificial graphite and natural graphite has been noted as one meeting the demand for higher capacity.

However, in a non-aqueous electrolyte secondary battery comprising as a negative electrode any graphite-based electrode material, singly or in admixture with other negative electrode materials capable of absorbing and releasing lithium, if an electrolyte comprising as a solvent a propylene carbonate which normally is preferably used in a lithium primary battery is used, the decomposition reaction of the solvent proceeds violently on the surface of the graphite electrode, disabling the smooth absorption of lithium into the graphite electrode and smooth release of lithium from the graphite electrode.

On the other hand, ethylene carbonate undergoes little such decomposition and thus has been widely used as a main solvent of electrolyte for non-aqueous electrolyte secondary battery. However, even if ethylene carbonate is used as a main solvent, the electrolyte decomposes on the surface of the electrode during charge and discharge, raising problems of drop of charge and discharge efficiency, deterioration of cycle performance, etc.

Further, ethylene carbonate exhibits a solidifying point as high as 36.4° C. as compared with propylene carbonate and thus is not used singly but is used normally in admixture with a low viscosity solvent. For this reason, the electrolyte for lithium secondary battery comprising a graphite-based negative electrode normally comprises a mixture of ethylene carbonate and diethyl carbonate. However, since most such low viscosity solvents normally have a low boiling point, it is disadvantageous in that when added in a large amount, the solvent exhibits a lowered flashpoint, though giving good electrolyte properties. On the contrary, when added only in a small amount, it is disadvantageous in electrical conductivity and viscosity at low temperatures.

Under these circumstances, Japanese Patent Laid-Open No. 1992-87156 proposes an electrolyte comprising as a solvent a mixture of a specific compound which makes unsaturated carbon-carbon bond difficultly reactive with lithium chain-like, e.g., vinylethylene carbonate and 1,2-dimethoxyethane as a low boiling solvent in the same volume as that of the specific compound in a non-aqueous electrolyte battery comprising metallic lithium as a negative electrode.

On the other hand, γ-butyrolactone, etc., which is a cyclic ester, has a high relative dielectric constant as well as a low solidifying point and thus can be used without being mixed with a low viscosity solvent. However, the γ-butyrolactone-based electrolyte, too, is subject to progress of decomposition of γ-butyrolactone on the surface of the graphite electrode during charge, causing deterioration of battery performance.

Japanese Patent Laid-Open No. 1999-31525 proposes an electrolyte solvent comprising as a main component γ-butyrolactone and as a subsidiary component ethylene carbonate in an amount of from 15 to 35% by volume and practically comprising diethyl carbonate in an amount of not smaller than 16% by volume to inhibit the decomposition of γ-butyrolactone in a non-aqueous electrolyte secondary battery comprising a graphite-based carbon material as a negative electrode.

However, the electrolyte disclosed in the above cited patent leaves something to be desired, though showing an excellent effect in its own way.

The present invention has been worked out to solve these problems. An object of the present invention is to provide a non-aqueous electrolyte secondary battery having a high energy density comprising a negative electrode containing a carbon-based material which is subject to minimized decomposition of electrolyte to exhibit a high charge and discharge efficiency and show excellent storage properties and cycle life performance even at high temperatures.

DISCLOSURE OF THE INVENTION

Under these circumstances, the inventors made extensive studies. As a result, it was found that the use of an electrolyte containing a specific vinylethylene carbonate compound as an electrolyte for non-aqueous electrolyte secondary battery comprising a negative electrode comprising a carbon-based material allows the efficient production of a stable lithium ion-permeable film on the surface of the negative electrode from the beginning of initial charge, making it possible to inhibit excessive decomposition of the electrolyte and hence improve the charge and discharge efficiency, storage properties and cycle life performance. The present invention has thus been worked out.

In other words, the essence of the invention lies in a non-aqueous electrolyte secondary battery comprising a negative electrode, a positive electrode and an electrolyte having a lithium salt dissolved in a non-aqueous solvent, characterized in that the non-aqueous solvent contains a vinylethylene carbonate compound represented by the following general formula (I) in an amount of from 0.01% to 20% by weight:

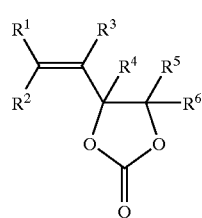

(I)

wherein $R^1$, $R^2$, $R^3$, $R^4$, $R^5$ and $R^6$ each independently represent a hydrogen atom or $C_1$–$C_4$ alkyl group.

The present invention also lies in a non-aqueous electrolyte for non-aqueous electrolyte secondary battery comprising at least a negative electrode and a positive electrode capable of absorbing/releasing lithium which comprises a solute and a non-aqueous solvent, characterized in that the non-aqueous solvent contains a vinylethylene carbonate compound represented by the foregoing general formula (I) in an amount of from 0.01 to 20% by weight.

The present invention further lies in a non-aqueous electrolyte for non-aqueous electrolyte secondary battery comprising at least a negative electrode and a positive electrode capable of absorbing/releasing lithium which comprises a solute and a non-aqueous solvent, characterized in that the non-aqueous solvent contains one or more solvents selected from solvents having a relative dielectric constant of not smaller than 25 in an amount of not smaller than 90% by weight, exhibits a flash point of not lower than 70° C. and comprises at least one vinylethylene carbonate represented by the following general formula (I) incorporated therein.

In the invention, the negative electrode preferably contains a carbon-based material capable of absorbing and releasing lithium, and the carbon-based material capable of absorbing and releasing lithium preferably comprises a carbon-based material having a d value of from 0.335 to 0.34 nm on lattice plane (002 plane) as determined by X-ray diffractometry.

In the non-aqueous electrolyte secondary battery of the invention, the non-aqueous solvent preferably is a mixed solvent containing a cyclic carbonate selected from the group consisting of alkylene carbonates the alkylene group moiety of which each have from 2 to 4 carbon atoms and a chain carbonate selected from the group consisting of dialkyl carbonate the alkyl group moiety of which each have from 1 to 4 carbon atoms except the vinylethylene carbonate compound of the general formula (I) each in an amount of not smaller than 20 vol-%, with the proviso that the content of said carbonates accounts for not smaller than 70 vol-% based on the total amount thereof, and the non-aqueous solvent except the vinylethylene carbonate compound of the general formula (I) preferably contains one or more solvents selected from solvents having a relative dielectric constant of not smaller than 25 and exhibits a flash point of not lower than 70° C.

Further, the non-aqueous solvent except the vinylethylene carbonate compound of the general formula (I) preferably is selected from solvents having a relative dielectric constant of not smaller than 25. The solvent having a relative dielectric constant of not smaller than 25 is preferably ethylene carbonate, propylene carbonate, butylene carbonate, γ-butyrolactone or γ-valerolactone, particularly a mixture of ethylene carbonate and γ-butyrolactone.

The lithium salt is preferably at least one salt selected from $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

BEST MODE FOR CARRYING OUT THE INVENTION

Figure 1:
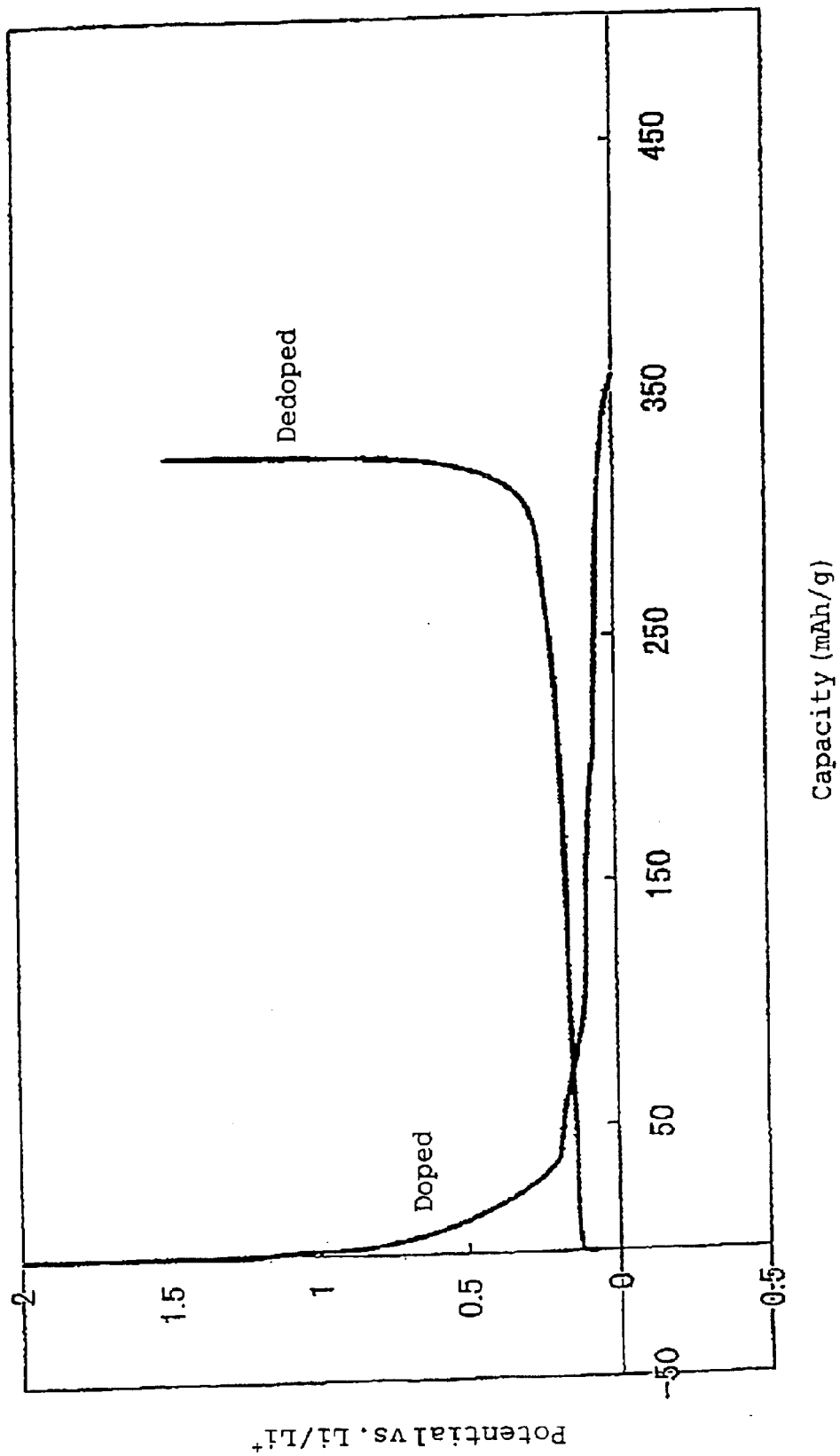
FIG. 1 is a graph illustrating the capacity-potential curve developed by charge and discharge at the 1st cycle in Example 1 of the invention.

The non-aqueous electrolyte secondary battery of the invention is characterized in that the non-aqueous solvent used therein contains a vinylethylene carbonate represented by the following general formula (I):

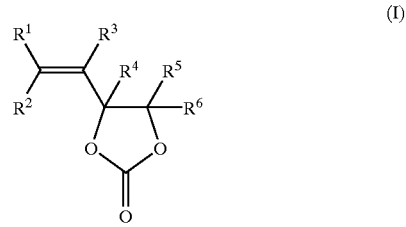

(I)

wherein $R^1$, $R^2$, $R^3$, $R^4$, $R^5$ and $R^6$ each independently represent a hydrogen atom or $C_1$–$C_4$ alkyl group.

In the general formula (I), when $R^1$, $R^2$, $R^3$, $R^4$, $R^5$ and $R^6$ each are a $C_1$–$C_4$ alkyl group, specific examples of the C1–C4 alkyl group include methyl group, ethyl group, n-propyl group, i-propyl group, n-butyl group, sec-butyl group, i-butyl group, and tert-butyl group. Preferred among these alkyl groups are methyl group and ethyl group. Specific examples of the vinylethylene carbonate compound represented by the general formula (I) include 4-ethenyl-1,3-dioxolane-2-one (occasionally referred to as "vinylethylene carbonate"), 4-ethenyl-4-methyl-1,3-dioxolane-2-one, 4-ethenyl-4-ethyl-1,3-dioxolane-2-one, 4-ethenyl-4-n-propyl-1,3-dioxolane-2-one, 4-ethenyl-5-methyl-1,3-dioxolane-2-one, 4-ethenyl-5-ethyl-1,3-dioxolane-2-one, 4-ethenyl-5-n-propyl-1,3-dioxolane-2-one, etc.

Among these vinylethylene carbonate compounds, 4-ethenyl-4-methyl-1,3-dioxolane-2-one is preferred, and vinylethylene carbonate is particularly preferred.

The compound of the general formula (I) may have substituents so far as the desired effect of the invention cannot be excessively impaired.

The content of the compound of the general formula (I) in the non-aqueous solvent is normally from 0.01 to 20% by weight, it preferably from 0.01 to 10% by weight, more preferably from 0.1 to 10% by weight, even more preferably from 0.1 to 7% by weight, particularly from 0.1 to 5% by weight. When the content of the compound of the general formula (I) falls below 0.01% by weight, the protective film cannot be sufficiently effected. On the contrary, when the content of the compound of the general formula (I) exceeds 20% by weight, the electrolyte has a high viscosity and hence a low electrical conductivity, deteriorating the performance of the battery.

Examples of the non-aqueous solvent other than the compound of the general formula (I) to be used in the invention include cyclic carbonates such as ethylene carbonate, propylene carbonate and butylene carbonate, chain carbonates such as dimethyl carbonate, diethyl carbonate and ethylmethyl carbonate, cyclic esters such as γ-butyrolactone and γ-valerolactone, chain ethers such as tetrahydrofuran, 2-methyltetrahydrofuran and tetrahydropyran, chain ethers such as dimethoxyethane and dimethoxymethane, sulfur-containing organic solvents such as sulfolane and diethylsulfolane, etc. Two or more of these solvents may be used in admixture.

The non-aqueous solvent is a mixed solvent containing a cyclic carbonate selected from the group consisting of alkylene carbonates the alkylene group moiety of which each have from 2 to 4 carbon atoms and a chain carbonate selected from the group consisting of dialkyl carbonate the alkyl group moiety of which each have from 1 to 4 carbon atoms except the vinylethylene carbonate compound of the general formula (I) each in an amount of not smaller than 20 vol-%, with the proviso that the content of the carbonates accounts for not smaller than 70 vol-% based on-the total amount thereof.

The term "vol-%" as used herein is meant to indicate one measured at room temperature, i.e., 25° C. However, any solvent which stays solid at 25° C. shall be heated to its melting point where it is then measured in molten state.

Specific examples of the alkylene carbonate the alkylene group moiety of which has from 2 to 4 carbon atoms include ethylene carbonate, propylene carbonate, butylene carbonate, etc. Preferred among these alkylene carbonates are ethylene carbonate and propylene carbonate.

Specific examples of the dialkyl carbonate the alkyl group moiety of which has from 1 to 4 carbon atoms include dimethyl carbonate, diethyl carbonate, di-n-propyl carbonate, ethylmethyl carbonate, methyl-n-propyl carbonate, ethyl-n-propyl carbonate, etc. Preferred among these dialkyl carbonates are dimethyl carbonate, diethyl carbonate, and ethylmethyl carbonate. The mixed non-aqueous solvent may contain solvents other than carbonate.

Another preferred embodiment of the non-aqueous electrolyte secondary battery of the invention lies in a non-aqueous electrolyte secondary battery comprising a negative electrode, a positive electrode and a non-aqueous electrolyte-made of a solute and a non-aqueous solvent, characterized in that the non-aqueous solvent contains one or more solvents selected from solvents having a relative dielectric constant of not smaller than 25 in an amount of not smaller than 90% by weight, exhibits a flash point of not lower than 70° C. and comprises at least one vinylethylene carbonate represented by the foregoing general formula (I) incorporated therein.

The non-aqueous solvent having a relative dielectric constant of not smaller than 25 to be used in the foregoing embodiment of the invention is not specifically limited. However, ethylene carbonate, propylene carbonate, butylene carbonate, γ-butyrolactone, γ-valerolatone, sulfolane, 3-methylsulfolane, dimethyl sulfoxide, etc. can be exemplified. Preferred among these non-aqueous solvents are ethylene carbonate, propylene carbonate, butylene carbonate, γ-butyrolactone, and γ-valerolatone. A mixture of ethylene carbonate and γ-butyrolactone is particularly preferred. Two or more of these solvents may be used in admixture. The combination of these solvents is not specifically limited.

Further, in the foregoing embodiment of the invention, to the non-aqueous solvent having a relative dielectric constant of not smaller than 25 may be added one or more non-aqueous solvents other than mentioned above, e.g., dialkyl (preferably having from 1 to 4 carbon atoms) carbonate such as dimethyl carbonate, diethyl carbonate, di-n-propyl carbonate and ethylmethyl carbonate, cyclic ether such as tetrahydrofuran and 2-methyltetrahydrofuran, chain ether such as dimethoxyethane and dimethylmethane, chain ester such as methyl sacetate and ethyl propionate. In this case, these solvents may be added in such a combination that the flash point of the non-aqueous solvents, including-those added, is not lower than 70° C.

As the solute of the electrolyte to be used in the invention there may be used a lithium salt. The lithium salt is not specifically limited so far as it can be used as a solute. A specific example of such a lithium salt is an inorganic lithium salt selected from $LiClO_4$, $LiPF_6$ and $LiBF_4$ or fluorine-containing organic lithium salt such as $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$. Preferred among these lithium salts are $LiPF_6$ and $LiBF_4$. Two or more of these solutes may be used in admixture.

The molarity of lithium salt as solute in the electrolyte is normally from 0.5 to 3 mols/l but is preferably from 0.5 to 2 mols/l. When the molarity of lithium salt falls below 0.5 mols/l or exceeds 2 mols/l, it is disadvantageous in that the electrolyte exhibits a low electrical conductivity that deteriorates the battery performance.

The material of the negative electrode constituting the battery of the invention is not specifically limited so far as it contains a carbon-based material capable of absorbing and releasing lithium. Specific examples of such a carbon-based material include pyrolysis product of organic material obtained under various pyrolysis conditions, artificial graphite, natural graphite, etc. Preferably, natural graphite produced by high temperature heat treatment of graphitizable pitch obtained from various materials, purified natural graphite or material obtained by subjecting these graphites may be mainly used. However, these graphite materials preferably have a d value (interlaminar distance) of from 0.335 to 0.34 nm, more preferably from 0.335 to 0.337 nm on lattice plate as determined by X-ray diffractometry according to the method of the Japan Society of Promotion of Scientific Research. These graphite materials preferably have an ash content of not greater than 1% by weight, more preferably, not greater than 0.5% by weight, most preferably not greater than 0.1% by weight, and a crystalline size (Lc) of not smaller than 30 nm as determined by X-ray diffractometry according to the method of the Japan Society of Promotion of Scientific Research.

Further, the crystalline size of the graphite is more preferably not smaller than 50 nm, most preferably not smaller than 100 nm. The median diameter of graphite material is from 1 to 100 μm, preferably from 3 to 50 μm, more preferably from 5 to 40 μm, more preferably from 7 to 30 μm as determined by laser diffractometry/scattering method. BET process specific surface area of graphite material is from 0.3 to 25.0 $m^2/g$, preferably from 0.5 to 25.0 $m^2/g$, more preferably from 0.7 to 20.0 $m^2/g$, even more preferably from 0.7 to 15.0 $m^2/g$, still even more preferably from 1.0 to 15.0 $m^2/g$, still even more preferably from 1.5 to 10.0 $m^2/g$. Moreover, the graphite preferably exhibits an intensity R ($=I_B/I_A$) of from 0 to 0.5 wherein $I_A$ is the peak intensity in the range of from 1,580 to 1,620 cm-1 and $I_A$ is the peak intensity in the range of from 1,350 to 1,370 $cm^{-1}$ as determined by Raman spectroscopy, and a peak half width of not greater than 26 $cm^{-1}$, more preferably not greater than 25 $cm^{-1}$ in the range of from 1,580 to 1,620 $cm^{-1}$.

Further, the carbon-based material may be used in admixture with a negative electrode material capable of absorbing and releasing lithium. Examples of the negative electrode material capable of absorbing and releasing lithium other than carbon-based material include metal oxide material such as tin oxide and silicon oxide, metallic lithium, and various lithium alloys. Two or more of these negative electrode materials may be used in admixture.

The process for the production of a negative electrode from these negative electrode materials is not specifically limited. The negative electrode can be produced, e.g., by optionally adding a binder, a thickening agent, an electrically-conducting material, a solvent, etc. to a negative electrode material to make a slurry, applying the slurry to a current collector substrate, and then drying the coated substrate. Alternatively, the negative electrode material may be rolled as it is to prepare a sheet-like electrode or may be compression-molded to prepare a pelletized electrode.

The binder to be used in the production of the electrode is not specifically limited so far as it is a material inert to the solvent to be used in the production of the electrode or the electrolyte. Specific examples of such a material include polyvinylidene fluoride, polytetrafluoroethylene, styrene-butadiene rubber, isoprene rubber, butadiene rubber, etc.

Examples of the thickening agent include carboxymethyl cellulose, methyl cellulose, hydroxymethyl cellulose, ethyl cellulose, polyvinyl alcohol, oxidized starch, phosphated starch, casein, etc.

Examples of the electrically-conducting material include metallic material such as copper and nickel, and carbon-based material such as graphite and carbon black.

As the material of the current collector for negative electrode there may be used a metal such as copper, nickel and stainless steel. Preferred among these metals is a copper foil because it can be easily formed into a thin film and from the standpoint of cost.

As the material of the positive electrode constituting the battery of the invention there may be used a material capable of absorbing and releasing lithium such as lithium transition metal composite oxide material, e.g., lithium cobalt oxide, lithium nickel oxide and lithium manganese oxide.

The process for the production of the positive electrode is not specifically limited. The negative electrode can be produced according to the foregoing process for the production of the negative electrode. Referring to the shape of the positive electrode, a binder, an electrically-conducting material, a solvent, etc. may be optionally added to and mixed with the positive electrode material which is then applied to a current collector substrate to form a sheet electrode or press-molded to form a pelletized electrode.

As the material of the current collector for positive electrode there may be used a metal such as aluminum, titanium and tantalum or alloy thereof. Particularly preferred among these materials is aluminum or alloy thereof because it has a light weight and thus gives a high energy density.

The material and shape of the separator to be used in the battery of the invention are not specifically limited. However, the separator is preferably selected from materials which are inert to the electrolyte and have excellent liquid retaining properties. A porous sheet or nonwoven cloth made of a polyolefin such as polyethylene and polypropylene as a raw material is preferably used.

The process for the production of the battery of the invention having at least a negative electrode, a positive electrode and a non-aqueous electrolyte is not specifically limited but can be properly selected from those commonly employed.

The shape of the battery is not specifically limited. A cylinder type obtained by spirally winding a sheet-like electrode and a separator, a cylinder type having an inside out structure comprising a pelletized electrode and a separator in combination, a coin type having a pelletized electrode and a separator laminated on each other, etc. can be used.

The present invention will be further described in the following examples and comparative examples, but the present invention should not be construed as being limited thereto so far as they fall within the scope of the invention.

EXAMPLE 1

An electrolyte was prepared by dissolving a vinylethylene carbonate in a propylene carbonate in an amount of 5% by weight, and then dissolving thoroughly dried lithium hexafluorophosphate (LiPF$_6$) as a solute in the solution in an amount of 1 mol/l in dried argon atmosphere.

To 94 parts by weight of KS-44 (trade name; produced by Timcal (??) Co., Ltd.), which is an artificial graphite powder having a d value of 0.336 nm on lattice plane (002 plane) as determined by X-ray diffractometry, a crystalline size (Lc) of not lower than 100 nm (264 nm), an ash content of 0.04% by weight, a median diameter of 17 μm as determined by laser diffractometry/scattering method, a BET process specific surface area of 8.9 m$^2$/g, an intensity R (=I$_B$/I$_A$) of 0.15 wherein I$_A$ is the peak intensity in the range of from 1,580 to 1,620 cm−1 and I$_A$ is the peak intensity in the range of from 1,350 to 1,370 cm$^{-1}$ as determined by Raman spectroscopy, and a peak half width of 22.2 cm$^{-1}$ in the range of from 1,580 to 1,620 cm$^{-1}$ were added 6 parts by weight (solid content) of a-dispersion of styrene-butadiene rubber (SBR) in distilled water. The mixture was then stirred by means of a disperser to make a slurry. The slurry thus made was uniformly applied to a copper foil having a thickness of 18 μm as a negative electrode current collector, dried, and then punched into a disk having a diameter of 12.5 mm to prepare an electrode as a working electrode. A lithium foil was then provided as a counter electrode on the working electrode with a separator impregnated with the electrolyte interposed therebetween to prepare a coin type half cell.

COMPARATIVE EXAMPLE 1

A coin type half cell was prepared in the same manner as in Example 1 except that an electrolyte prepared by dissolving a vinylene carbonate in a propylene carbonate in an amount of 5% by weight, and then dissolving LIPEFG in the solution in an amount of 1 mol/l was used.

COMPARATIVE EXAMPLE 2

A coin type half cell was prepared in the same manner as in Example 1 except that an electrolyte prepared by dissolving LiPF$_6$ in a propylene carbonate in an amount of 1 mol/l was used.

EXAMPLE 2

A coin type half cell was prepared in the same manner as in Example 1 except that an electrolyte prepared by dissolving a vinylethylene carbonate in a 1:1 (by volume) mixture of ethylene carbonate and diethyl carbonate in an amount of 2% by weight, and then dissolving LiPF$_6$ in the solution in an amount of 1 mol/l was used.

COMPARATIVE EXAMPLE 3

A coin type half cell was prepared in the same manner as in Example 1 except that an electrolyte prepared by dissolving LiPF$_6$ in a 1:1 (by volume) mixture of ethylene carbonate and diethyl carbonate in an amount of 1 mol/l was used.

Subsequently, the coin type half cells of Examples 1 and 2 and Comparative Examples 1 to 3 thus prepared were subjected to cycle life test involving discharge with a constant current of 0.2 mA to a termination voltage of 0 V and charge with a constant current of 0.4 mA to a termination voltage of 1.5 V at 25° C.

The half cells of Examples 1 and 2 and Comparative Example 3 which had been subjected to 10 cycles of charge and discharge were stored in doped state at 60° C. for 48 hours, subjected to dedoping, and then examined for storage properties.

Figure 2:
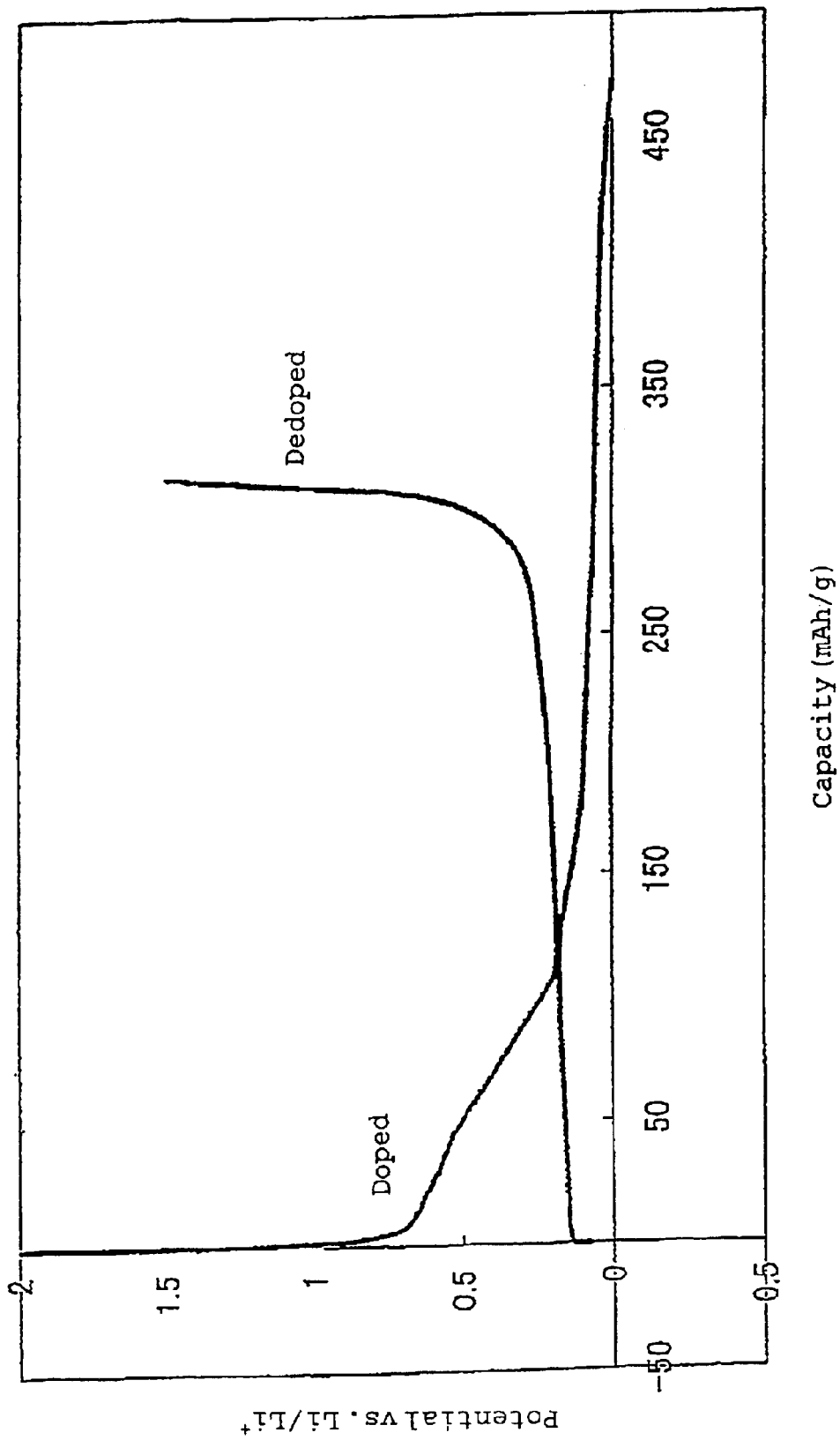
FIG. 2 is a graph illustrating the capacity-potential curve developed by charge and discharge at the 1st cycle in Comparative Example 1 of the invention.
Figure 3:
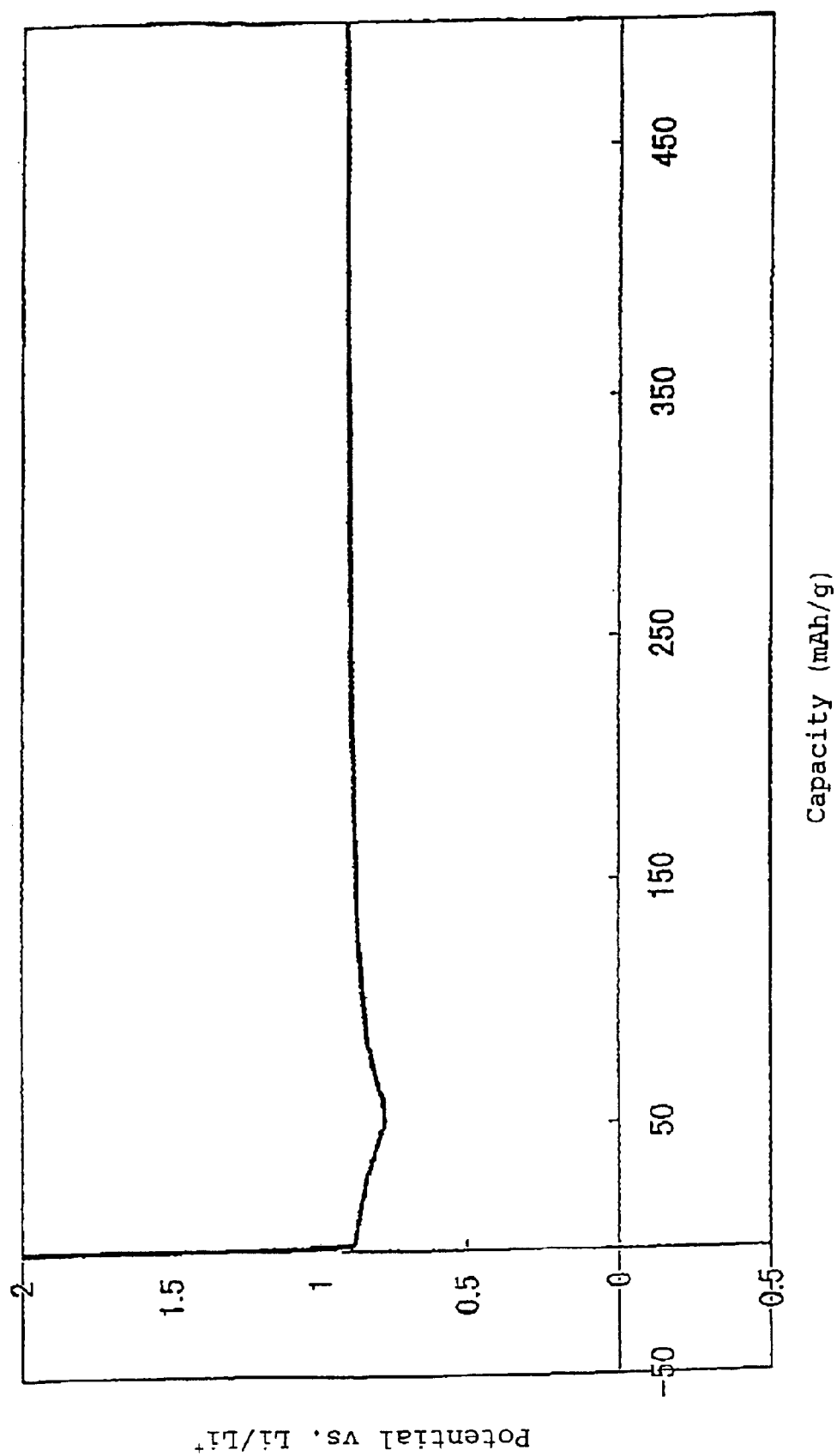
FIG. 3 is a graph illustrating the capacity-potential curve developed by charge and discharge at the 1st cycle in Comparative Example 2 of the invention.

The capacity-potential curve developed by charge and discharge at the 1st cycle in Example 1 and Comparative Examples 1 and 2 are shown in FIGS. 1, 2 and 3, respectively. The term "capacity" as used herein is meant to indicate the capacity of the graphite used as a working electrode per weight.

The dedoped capacity (capacity of lithium dedoped from the working electrode) at the 1st cycle and the efficiency (dedoped capacity×100/doped capacity) are set forth in Table 1.

As storage properties, the percentage of capacity of Examples 1 and 2 and Comparative Example 3 before (dedoped capacity at the 10th cycle) and after (dedoped capacity at the 11th cycle) storage are set forth in Table 2.

As shown in FIG. 3, in the case of single use of propylene carbonate as a solvent, a flat portion is observed in the vicinity of 0.8 V where the decomposition of the electrolyte proceeds, disabling doping to 0 V. As shown in FIG. 2, when an electrolyte containing a vinylene carbonate is used, doping is made possible to 0 V, but the decomposition of the electrolyte cannot be sufficiently conducted. As shown in FIG. 1, the use of an electrolyte containing a vinylethylene carbonate makes it possible to inhibit the excessive decomposition of the electrolyte.

As can be seen in Tables 1 and 2, the use of an electrolyte containing a vinylethylene carbonate makes it possible to enhance efficiency while keeping a high capacity and improve storage properties at high temperature.

TABLE 1

|  | Dedoped capacity at 1st cycle (mAh/g) | Efficiency at 1st cycle (%) |
|---|---|---|
| Example 1 | 327 | 91.6 |
| Example 2 | 314 | 91.6 |
| Comparative Example 1 | 315 | 66.6 |
| Comparative Example 2 | — | — |
| Comparative Example 3 | 318 | 91.2 |

TABLE 2

|  | Storage properties (%) |
|---|---|
| Example 1 | 97.6 |
| Example 2 | 97.1 |
| Comparative Example 3 | 96.7 |

EXAMPLE 3

To 85 parts by weight of LiCoO$_2$ as a positive active material were added 9 parts by weight of a polyvinylidene fluoride KF-1000 (trade name; produced by Kureha Chemical Industry Co., Ltd.). The mixture was then dispersed with N-methyl-2-pyrrolidone to make a slurry. The slurry was uniformly applied to an aluminum foil having a thickness of 20 μm as a positive electrode current collector, dried, and then punched into a disk having a diameter of 12.5 mm to prepare a positive electrode.

To 95 parts by weight of KS-44 (trade name; produced by Timcal (??) Co., Ltd.), which is an artificial graphite powder having a d value of 0.336 nm on lattice plane (002 plane) as determined by X-ray diffractometry, a crystalline size (Lc) of not lower than 100 nm (264 nm), an ash content of 0.04% by weight, a median diameter of 17 μm as determined by laser diffractometry/scattering method, a BET process specific surface area of 8.9m$^2$/g, an intensity R (=I$_B$/I$_A$) of 0.15 wherein I$_A$ is the peak intensity in the range of from 1,580 to 1,620 cm−1 and I$_A$ is the peak intensity in the range of from 1,350 to 1,370 cm$^{-1}$ as determined by Raman spectroscopy, and a peak half width of 22.2 cm$^{-1}$ in the range of from 1,580 to 1,620 cm$^{-1}$ as a negative active material were added 5 parts by weight of a polyvinylidene fluoride. The mixture was then dispersed with N-methyl-2-pyrrolidone to make a slurry. The slurry thus made was uniformly applied to a copper foil having a thickness of 18 μm as a negative electrode current collector, dried, and then punched into a disk having a diameter of 12.5 mm to prepare a negative electrode.

An electrolyte was prepared by dissolving a vinylethylene carbonate in a 1:1 (by volume) mixture of propylene carbonate and ethylene carbonate in a proportion of 3% per 97% by weight, and then dissolving thoroughly dried lithium hexafluorophosphate (LiPF$_6$) as a solute in the solution in an amount of 1 mol/l in dried argon atmosphere.

The positive electrode was then received in a stainless steel can which also acts as a positive electrode conductor. The negative electrode was then put on the positive electrode with a polyethylene separator impregnated with the electrolyte interposed therebetween. The can was then caulked with a sealing plate which also acts as a negative electrode conductor with an insulating gasket interposed therebetween to seal the can. Thus, a coin type battery was prepared.

COMPARATIVE EXAMPLE 4

A coin type battery was prepared in the same manner as in Example 3 except that an electrolyte prepared by dissolving LiPF$_6$ in a 1:1 mixture (by volume) of propylene carbonate and ethylene carbonate in an amount of 1 mol/l was used.

EXAMPLE 4

A coin type battery was prepared in the same manner as in Example 3 except that an electrolyte prepared by dissolving a vinylethylene carbonate in a 1:1 mixture (by volume) of ethylene carbonate and γ-butyrolactone in a proportion of 3% per 97% by weight, and then dissolving LiPF$_6$ in the solution in an amount of 1 mol/l was used.

COMPARATIVE EXAMPLE 5

A coin type battery was prepared in the same manner as in Example 3 except that an electrolyte prepared by dissolving LiPF$_6$ in a 1:1 mixture (by volume) of ethylene carbonate and γ-butyrolactone in an amount of 1 mol/l was used.

EXAMPLE 5

A coin type battery was prepared in the same manner as in Example 3 except that an electrolyte prepared by dissolving a vinylethylene carbonate in a 1:1 mixture (by volume) of propylene carbonate and γ-butyrolactone in a proportion of 3% per 97% by weight, and then dissolving LiPF$_6$ in the solution in an amount of 1 mol/l was used.

COMPARATIVE EXAMPLE 6

A coin type battery was prepared in the same manner as in Example 3 except that an electrolyte prepared by dissolving LiPF$_6$ in a 1:1 mixture. (by volume) of propylene carbonate and γ-butyrolactone in an amount of 1 mol/l was used.

EXAMPLE 6

A coin type battery was prepared in the same manner as in Example 3 except that an electrolyte prepared by dissolving a vinylethylene carbonate in propylene carbonate in a proportion of 3% per 97% by weight, and then dissolving LiPF$_6$ in the solution in an amount of 1 mol/l was used.

COMPARATIVE EXAMPLE 7

A coin type battery was prepared in the same manner as in Example 3 except that an electrolyte prepared by dissolving LiPF$_6$ in propylene carbonate in an amount of 1 mol/l was used.

EXAMPLE 7

A coin type battery was prepared in the same manner as in Example 3 except that an electrolyte prepared by dissolving a vinylethylene carbonate in a 1:1 mixture (by volume) of propylene carbonate and ethylene carbonate in a proportion of 5% per 95% by weight, and then dissolving LiPF$_6$ in the solution in an amount of 1 mol/l was used.

The batteries prepared in Examples 3 to 7 and Comparative Examples 4 to 7 were then subjected to cycle life test involving charge with a constant current of 0.5mA to a termination voltage of 4.2 V and discharge to a termination voltage of 2.5 V at 25° C.

The electrical conductivity of the electrolytes used in Examples 3 to 7 at 20° C. and −30° C. are set forth in Table 3. For the measurement of electrical conductivity, an electrical conductivity meter (CM-30S, produced by DKK-TOA CORPORATION) was used.

The flash point was measured according to JIS K-2265.

The discharge capacity per weight of negative electrode and charge-discharge efficiency at the 1st cycle of the various batteries are set forth in Table 4. The charge-discharge efficiency was determined by the following equation.

Charge-discharge efficiency (%)=[(Discharge capacity)/(Charge capacity)]×100

As shown in Table 4, Comparative Examples 4, 6 and 7 underwent violent decomposition of electrolyte and thus didn't act as battery.

On the other hand, the electrolytes of the examples of the invention didn't solidify even at −30° C. and exhibit a relatively high conductivity and thus provide an excellent capacity and charge-discharge efficiency when used in battery.

TABLE 3

|  | Electrical conductivity (mS/cm) | | Flash point (° C.) |
|---|---|---|---|
|  | 20° C. | −30° C. |  |
| Example 3 | 6.2 | 1.1 | 140 |
| Example 4 | 9.1 | 2.6 | 119 |
| Example 5 | 8.1 | 2.3 | 119 |
| Example 6 | 5.3 | 1.0 | 138 |
| Example 7 | 6.1 | 1.0 | 140 |

TABLE 4

|  | Capacity at 1st cycle (mAh/g) | Efficiency at 1st cycle (%) |
|---|---|---|
| Example 3 | 226 | 81.3 |
| Example 4 | 230 | 83.0 |
| Example 5 | 213 | 81.1 |
| Example 6 | 198 | 78.1 |
| Example 7 | 233 | 84.4 |
| Comparative Example 4 | — | — |
| Comparative Example 5 | 120 | 34.4 |
| Comparative Example 6 | — | — |
| Comparative Example 7 | — | — |

INDUSTRIAL APPLICABILITY

In a non-aqueous electrolyte secondary battery comprising a negative electrode containing a carbon-based material, the use of a non-aqueous solvent containing a vinylethylene carbonate compound represented by the general formula (I) makes it possible to prepare a battery which is subject to minimized decomposition of the electrolyte and provides a high capacity as well as exhibits excellent storage properties and cycle life performance and hence contribute to the reduction of the size of and improve the performance of the non-aqueous electrolyte secondary battery.

What is claimed is:

1. A non-aqueous electrolyte secondary battery comprising a negative electrode, a positive electrode and an electrolyte having a lithium salt dissolved in a non-aqueous solvent, wherein said non-aqueous solvent comprises a vinylethylene carbonate compound represented by the following formula (I) in an amount of from 0.01% to 20% by weight:

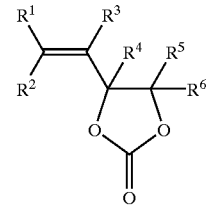

wherein $R^1$, $R^2$, $R^3$, $R^4$, $R^5$ and $R^6$ each independently represent a hydrogen atom or an alkyl group having 1 to 4 carbon atoms.

2. The non-aqueous electrolyte secondary battery according to claim 1, wherein said negative electrode comprises a carbon-based material capable of absorbing and releasing lithium.

3. The non-aqueous electrolyte secondary battery according to claim 2, wherein said carbon-based material capable of absorbing and releasing lithium comprises a carbon-based material having a d value of from 0.335 to 0.34 nm on lattice plane (002 plane) as determined by X-ray diffractometry.

4. The non-aqueous electrolyte secondary battery according to claim 1, wherein said non-aqueous solvent is a mixed solvent comprising (a) a cyclic carbonate selected from the group consisting of alkylene carbonates, with the exception of the vinylethylene carbonate compound of the formula (I), in an amount of not less than 20 vol-%. wherein the alkylene group of the alkylene carbonate has 2–4 carbon atoms; and (b) a chain carbonate selected from the group consisting of dialkyl carbonates in an amount of not less than 20 vol-%. wherein each alkyl group of the dialkyl carbonate has 1 to 4 carbon atoms.

wherein the total amount of (a) and (b) is not less than 70 vol-% based on the total volume of the solvent.

5. The non-aqueous electrolyte secondary battery according to claim 1, wherein said non-aqueous solvent further comprises one or more solvents having a relative dielectric constant of not less than 25 and wherein said non-aqueous solvent has a flash point of not lower than 70° C.

6. The non-aqueous electrolyte secondary battery according to claim 5, wherein said solvent having a relative dielectric constant of not less than 25 is selected from the group consisting of ethylene carbonate, propylene carbonate, butylene carbonate, γ-butyrolactone and γ-valerolactone.

7. The non-aqueous electrolyte secondary battery according to claim 5, wherein said solvents having a relative dielectric constant of not less than 25 is a mixture of ethylene carbonate and γ-butyrolactone.

8. The non-aqueous electrolyte secondary battery according to claim 1, wherein said non-aqueous solvent further comprises one or more solvents having a relative dielectric constant of not less than 25.

9. The non-aqueous electrolyte secondary battery according to claim 8, wherein said solvent having a relative dielectric constant of not less than 25 is selected from the group consisting of ethylene carbonate, propylene carbonate, butylene carbonate, γ-butyrolactone and γ-valerolactone.

10. The non-aqueous electrolyte secondary battery according to claim 8, wherein said solvent having a relative dielectric constant of not less than 25 is a mixture of ethylene carbonate and γ-butyrolactone.

11. The non-aqueous electrolyte secondary battery according to claim 1, wherein the lithium salt is at least one salt selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

12. The non-aqueous electrolyte secondary battery according to claim 1, wherein the solvent contains from 0.01 to 10% by weight of the vinylethylene carbonate compound represented by formula (I).

13. The non-aqueous electrolyte secondary battery according to claim 1, wherein the solvent contains from 0.1 to 5% by weight of the vinylethylene carbonate compound represented by formula (I).

14. A non-aqueous electrolyte for a non-aqueous electrolyte secondary battery comprising at least a negative electrode and a positive electrode capable of absorbing/releasing lithium, said non-aqueous electrolyte comprising a solute and a non-aqueous solvent, wherein said non-aqueous solvent comprises a vinylethylene carbonate compound represented by formula (I) in an amount of from 0.01 to 20% by weight:

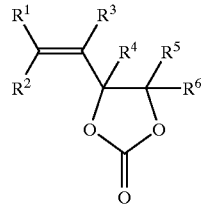

(I)

$R^1$, $R^2$, $R^3$, $R^4$, $R^5$ and $R^6$ each independently represent a hydrogen atom or an alkyl group having 1 to 4 carbon atoms.

15. The non-aqueous electrolyte according to claim 14, wherein said non-aqueous solvent is a mixed solvent comprising (a) a cyclic carbonate selected from the group consisting of alkylene carbonates with the exception of the vinylethylene carbonate compound of the formula (I) in an amount of not less than 20 vol-%, wherein the alkylene group of the alkylene carbonate has 2–4 carbon atoms; and (b) a chain carbonate selected from the group consisting of dialkyl carbonates in an amount of not less than 20 vol-%, wherein each alkyl group of the dialkyl carbonate has 1 to 4 carbon atoms, wherein the total amount of (a) and (b) is not less than 70 vol-% based on the total volume of the solvent.

16. The non-aqueous electrolyte according to claim 14, wherein said non-aqueous solvent further comprises one or more solvents having a relative dielectric constant of not less than 25.

17. The non-aqueous electrolyte according to claim 14, wherein the solvent contains from 0.01 to 10% by weight of the vinylethylene carbonate compound represented by formula (I).

18. The non-aqueous electrolyte according to claim 14, wherein the solvent contains from 0.1 to 5% by weight of the vinylethylene carbonate compound represented by formula (I).

19. A non-aqueous electrolyte for a non-aqueous electrolyte secondary battery comprising at least a negative electrode and a positive electrode capable of absorbing/releasing lithium, said non-aqueous electrolyte comprising a solute and a non-aqueous solvent, wherein said non-aqueous solvent comprises one or more solvents wherein said one or more solvents have a relative dielectric constant of not less than 25, is present in an amount of not less than 90% by weight, exhibits a flash point of not lower than 70° C. and comprises at least one vinylethylene carbonate represented by formula (I) in an amount of from 0.01% to 20% by weight:

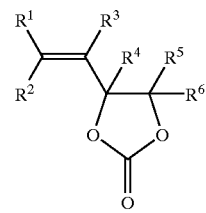

(I)

wherein $R^1$, $R^2$, $R^3$, $R^4$, $R^5$ and $R^6$ each independently represent a hydrogen atom or an alkyl group having 1 to 4 carbon atoms.

* * * * *